UNITED STATES PATENT OFFICE 2,611,729

INSECTICIDAL COMPOSITIONS CONTAINING HYDROCARBON ESTERS OF DIETHYL DITHIOPHOSPHORIC ACID

Jeffrey H. Bartlett, Westfield, Harry W. Rudel, Roselle Park, and Elmer B. Cyphers, Cranford, N. J., assignors to Standard Oil Development Company, a corporation of Delaware No Drawing. Application November 1, 1949, Serial No. 124,951

5 Claims. (Cl. 167—30)

This invention relates to new and useful improvements in parasiticidal preparations and more particularly to improved fungicides and insecticides. This invention also relates to methods of protecting organic material subject to attack by low orders of organisms. More specifically, this invention is concerned with parasiticidal compositions containing as the active ingredient a hydrocarbon ester of diethyl dithiophosphoric acid.

It has now been found that hydrocarbon esters of diethyl dithiophosphoric acid are extremely effective for checking the growth of insects and fungi. These compounds may thus be used as novel ingredients of parasiticidal compositions.

Suitable compounds of the indicated type are thus illustrated by Formula I below:

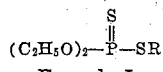

Formula I wherein R is a hydrocarbon radical.

Those compounds wherein the hydrocarbon ester is a cyclic ester, i. e., is either a cyclic radical or contains a cyclic group, are especially effective. In compounds of the cyclic ester preferred type, R may thus be an alicyclic or aralkyl radical. Some of the compounds of the preferred type contain cyclic hydrocarbon radicals derived from the following cyclic hydrocarbons: ethyl benzene, propyl benzene, toluene, diphenyl ethane, cymene, cyclohexane, cyclopentane, para menthane, methyl cyclohexane, thujane, dicyclopentane, etc.

Especially effective and desirable compounds of the present class of compounds are the alpha-pinene and styrene esters of diethyl dithiophosphoric acid.

It is especially surprising to find that the cyclic hydrocarbon esters possess extreme activity in view of the fact that non-cyclic esters show distinctly less activity. Thus the wax ester of diethyl dithiophosphoric acid shows distinctly inferior insecticidal activity as compared to the cyclic hydrocarbon esters tested.

The active cyclic hydrocarbon ester compounds of this invention may be prepared in general by addition or condensation reactions of suitable derivatives of the indicated hydrocarbons with diethyl dithiophosphoric acid. The latter, in turn, can be prepared by reacting ethyl alcohol with sulfides of phosphorus.

The following examples are given to illustrate this invention and include both the preparation of cyclic hydrocarbon esters of diethyl dithiophosphoric acid, and test results obtained on the active compounds used as parasiticides.

Example 1.—Preparation of alpha pinene ester of diethyl dithiophosphoric acid A 1-liter, 3-necked flask equipped with a stirrer, reflux condenser, and thermometer was charged with 276 g. (6 mols) of absolute ethanol and 333 g. (1.5 mols) of $P_2S_5$. The temperature rose to 70° C. within 15 minutes. After heating for an additional 20 minutes at 80° C. the product was filtered to remove a small amount of insoluble material. A portion of the diethyl dithiophosphoric acid thus formed (2.4 mols) was added to 326 g. (2.4 mols) of alpha pinene in a 4-necked, 3-liter flask equipped with a stirrer, reflux condenser, thermometer, and dropping funnel over a period of 1½ hours, during which time the temperature rose from 25° to 36° C. The product was then heated at 115° C. for 2 hours, after which it was permitted to stand overnight. The product was then washed successively with 200 cc. of distilled water, two 200 cc. portions of 10% aqueous $Na_2CO_3$ solution to remove any unreacted acid and finally washed with 200 cc. of distilled water. The cloudy organic layer was transferred to a 1-liter beaker and blown with nitrogen for 20 minutes at 110° C., followed by filtration to remove a small amount of insoluble material. A clear reddish liquid was obtained, which upon analysis was found to contain 10.4% phosphorus and 19.3% sulfur.

Example 2.—Preparation of styrene ester of diethyl dithiophosphoric acid

A cylindrically shaped glass reactor was charged with equimolecular quantities of vacuum distilled diethyl dithiophosphoric acid and styrene which had been washed free of inhibitors. The mixture was placed in the sunlight for 2 hours where the temperature rose from 23° C. to 49° C. during the first 30 minutes then gradually subsided to 44° C. during the next 1½ hours. After allowing the mixture to stand overnight at room temperature the resulting product had a neutralization number of 11.0.

The compounds prepared in Examples 1 and 2 were tested for parasiticidal activity. The values given in column I of the following table, represent the percentage mortality of the test insects after 96 hours following a two-minute immersion in an 0.25% aqueous solution or suspension of the test compound.

The results in column II are given as per cent mortality of the test insect after 96 hours following bloodstream injection of 0.002 cc. of a 5% solution of the test compound.

The figures in column III list the results obtained on the Nelson Drop test for house-fly toxicity. At full dosage, 5 mg. of test material/gm. body weight is placed on fly's body (0.002 cc. of a 5% solution per fly). Standards: 0.01 mg. DDT/gm. gives 65% kill (0.002 cc. of a 0.01% solution per fly). 0.038 mg. pyrethrin/gm. gives 40% kill (0.002 cc. of an 0.038% solution per fly).

Not all the tests were performed on each compound. The blank spaces indicate that that particular test was not performed.

compounds with clays such as fuller's earth, china clay, kaolin, or bentonite. Solid wettable powders for aqueous dispersion contain about 75% active ingredient, 24% clay, and about 1% wetting agent. Clay itself also acts as a spreading agent.

The term "dispersing agent" is consequently used hereafter to connote generically, the various "wetting agents" and "spreading agents" including clays, that are adapted to be admixed with the active compounds of this invention in order to secure better wetting and spreading of the sprays of the active ingredients in liquid vehicles in which they are insoluble. (See Frear—"Chemistry of Insecticides, Fungicides, and Herbicides," second edition, page 280.)

| Compound | Column I, Contact Insecticidal Activity, Percent Kill | | Column II, Bloodstream Insect Activity, Percent Kill *Periplanitus Americana* (American Roach) | | Column III, House-Fly Toxicity Nelson Drop Test |
|---|---|---|---|---|---|
| | *Blattella Germanica* (German Roach) A | *Omelpeltus Sociatus* (Milk Weed Bug) B | Female A | Male B | |
| Alpha-pinene ester of diethyl dithiophosphoric acid | | 100 | 100 | 100 | D −100<br>D/5 −100<br>D/10 −95 |
| Styrene ester of diethyl dithiophosphoric acid | 100 | 100 | 100 | 100 | D −100<br>D/5 −100<br>D/10 −100<br>D/50 −95<br>D/100 −55<br>D/200 −40 |
| Chloro wax ester of diethyl dithiophosphoric acid | 30 | 5 | 20 | 40 | |
| DDT | 100 | 100 | 100 | 100 | D/500 −65 |
| Pyrethrin | | | | | D/132 −40 |

These figures indicate that the hydrocarbon esters of this invention are especially and surprisingly effective contact insecticides as good as DDT and pyrethrin. The chloro wax ester, on the other hand, exhibited a contact insecticide activity only one-twentieth as great as the other compounds tested.

The compounds of this invention which in most cases are liquids, are best distributed in the form of sprays, such as in aqueous dispersions or dust compositions of the active ingredient with a powdered clay.

Since the compounds of this invention are insoluble in water, it is preferable to use them admixed with wetting or emulsifying agents so as to be able to secure aqueous emulsions and consequent uniformity of dispersion in the resulting colloidal system. The use of these wetting agents also increases the spreading action of the spray by decreasing its surface tension. This results in the securing of better contact of the spray with the surface being treated, and consequently brings the active ingredient into intimate contact with the parasite life. The concentration of active ingredient in the aqueous emulsions varies with the insect pests to be treated. In general, the aqueous emulsion contains about 5% active ingredient, and 1% wetting agent by weight. Thus, a typical emulsion concentrate formulation consists of 83% alpha-pinene ester of diethyl dithiophosphoric acid, and 17% petroleum sulfonate of about $C_{10}$–$C_{20}$ length by weight. This mixture can then be diluted with about 94 parts of water to 6 parts of concentrate.

The active compounds of this invention may also desirably be made up in solid compositions. A dust composition containing about 5% active ingredient is made up by admixing the active Among the water soluble wetting agents that can be used are the sulfates of long chain alcohols such as dodecanol up to octadecanol, sulfonated amide and ester derivatives, sulfonated aromatics, and mixed alkyl-aryl sulfonate derivatives, esters of fatty acids such as the ricinoleic acid ester of sorbitol, and petroleum sulfonates of $C_{10}$ to $C_{20}$ length. The non-ionic emulsifying agents such as the ethylene oxide condensation products of alkylated phenols may also be used.

Solvents for the compounds of this invention may be utilized as auxiliary agents if desired. Among the solvents for the compounds of this invention are: naphtha, kerosene, aromatics (toluene, etc.) alcohols, ketones such as acetone or methyl ethyl ketone, esters and halogenated hydrocarbons.

The compounds of this invention may also be admixed with carriers that are themselves active, such as other parasiticides, hormones, herbicides, fertilizers, and wetting agents. Stomach and contact insecticides such as the arsenates, fluorides, rotenone, and the various fish poisons and organic insecticides, such as di(p-)chlorophenyl-trichloroethane, benzene-hexachloride, and similar products may also be advantageously added.

It is to be understood that the invention is not limited to the specific examples which have been offered merely as illustrations, since many other derivatives can be prepared, and that modifications may be made without departing from the spirit of the invention.

What is claimed is:

1. An insecticidal dust composition comprising the styrene ester of diethyl dithiophosphoric acid admixed with a powdered clay.

2. An insecticidal dust composition comprising the alpha-pinene ester of diethyl dithiophosphoric acid admixed with powdered clay.

3. An insecticidal dust composition as in claim 2 in which the clay is bentonite.

4. An insecticidal composition comprising the styrene ester of diethyl dithiophosphoric acid admixed with a petroleum sulfonate of $C_{10}$ to $C_{20}$ lengths, said sulfonate being present in an amount corresponding to about one fifth by weight of the styrene ester.

5. An insecticidal dust composition comprising a hydrocarbon ester selected from the group consisting of the styrene and alpha-pinene esters of diethyl dithiophosphoric acid as the active ingredient, admixed with a powdered clay.

JEFFREY H. BARTLETT.
HARRY W. RUDEL.
ELMER B. CYPHERS.

REFERENCES CITED

The following references are of record in the file of this patent:

UNITED STATES PATENTS

| Number | Name | Date |
|---|---|---|
| 1,939,951 | Buchanan | Dec. 19, 1933 |
| 2,063,629 | Salzberg | Dec. 8, 1936 |
| 2,143,639 | Caprio | Jan. 10, 1939 |
| 2,269,396 | Jayne | Jan. 6, 1942 |

OTHER REFERENCES

Schrader, Development of New Insecticides, B. I. O. S. Trip No. 1103; pages 1, 2 and 33 to 35 at hand, and considered pertinent. (Publication date April 23, 1948, Bibliography of Science and Ind. Reports, volume 9, number 4, page 284.)

Fiat Final Report 949, "Organic Chemical Intermediates for Insecticides, Fungicides and Rodenticides, pages 19 to 20. PB 60890 October 14, 1946.